INVENTORS
VICTOR HARMS
JERRY H. SCHWARTZ
by R. J. Filipkowski
AGENT

INVENTORS
VICTOR HARMS
JERRY H. SCHWARTZ
by R. J. Filipkowski
AGENT

| TRANSMISSION | | | | | | SELECTION | | | | | |
|---|---|---|---|---|---|---|---|---|---|---|---|
| CODE GROUP | ENERGIZED CHANNELS | | | | | BAR | BUS | TREE | MATRIX POSITION | ELEMENT OPERATED | PATH CONNECTED |
| | 10 | 11 | 12 | 13 | 14 | | | | | | |
| 1 | | | X | X | | $X_4$ | $Y_A$ | A | 66 | $A_4$ | (+)→L·A1, L·A2, L·A3. |
| 2 | | | | | X | $X_1$ | $Y_A$ | A | 63 | $A_1$ | $Y_B$→1A2− |
| 3 | | | X | | | $X_2$ | $Y_A$ | A | 64 | A2 | 1A2− → 1A3− |
| 4 | | | | X | | $X_3$ | $Y_A$ | A | 65 | $A_3$ | 1A3− → $Y_{BH}$ |
| 5 | | X | | | | $X_1$ | $Y_{BH}$ | B | 59 | $BH_1$ | $Y_C$ → 1BH2− |
| 6 | | X | X | | X | $X_2$ | $Y_{BH}$ | B | 60 | $BH_2$ | 1BH2−→ 1BH3− |
| 7 | | X | | X | X | $X_3$ | $Y_{BH}$ | B | 61 | $BH_3$ | 1BH3−→ $Y_{CH}$ |
| 8 | X | | | | | $X_1$ | $Y_{CH}$ | C | 59 | $CH_1$ | $Y_D$ → 2CH3− |
| 9 | X | | | X | X | $X_3$ | $Y_{CH}$ | C | 61 | $CH_3$ | 2CH3−→ $Y_{DK}$ |
| 10 | X | X | | X | | $X_3$ | $Y_{DK}$ | D | 53 | LOAD | (+)→ LOAD D53 → (⏚) |
| 11 | X | | X | X | | $X_4$ | $Y_{CH}$ | C | 62 | CH4 | (+)→ L.CH1, L.CH2, L.CH3 |
| 12 | | X | X | X | | $X_4$ | $Y_{BH}$ | B | 62 | BH4 | (+)→L·BH1, L·BH2, L·BH3 |
| 13 | | | X | X | | $X_4$ | $Y_A$ | A | 66 | A4 | AS IN (1) |

Fig. 3.

INVENTORS
VICTOR HARMS
JERRY H. SCHWARTZ
by R. J. Filipkowski
AGENT

United States Patent Office 3,047,840

Patented July 31, 1962

3,047,840

TRANSLATORS FOR MULTI-CHANNEL CODES EMPLOYING MATRICES

Victor Harms, 4224 16th St. SW., and Jerry Howard Schwartz, 3032 Hampton Crescent, both of Calgary, Alberta, Canada Filed Feb. 3, 1960, Ser. No. 6,525
18 Claims. (Cl. 340—166)

Figure 1:
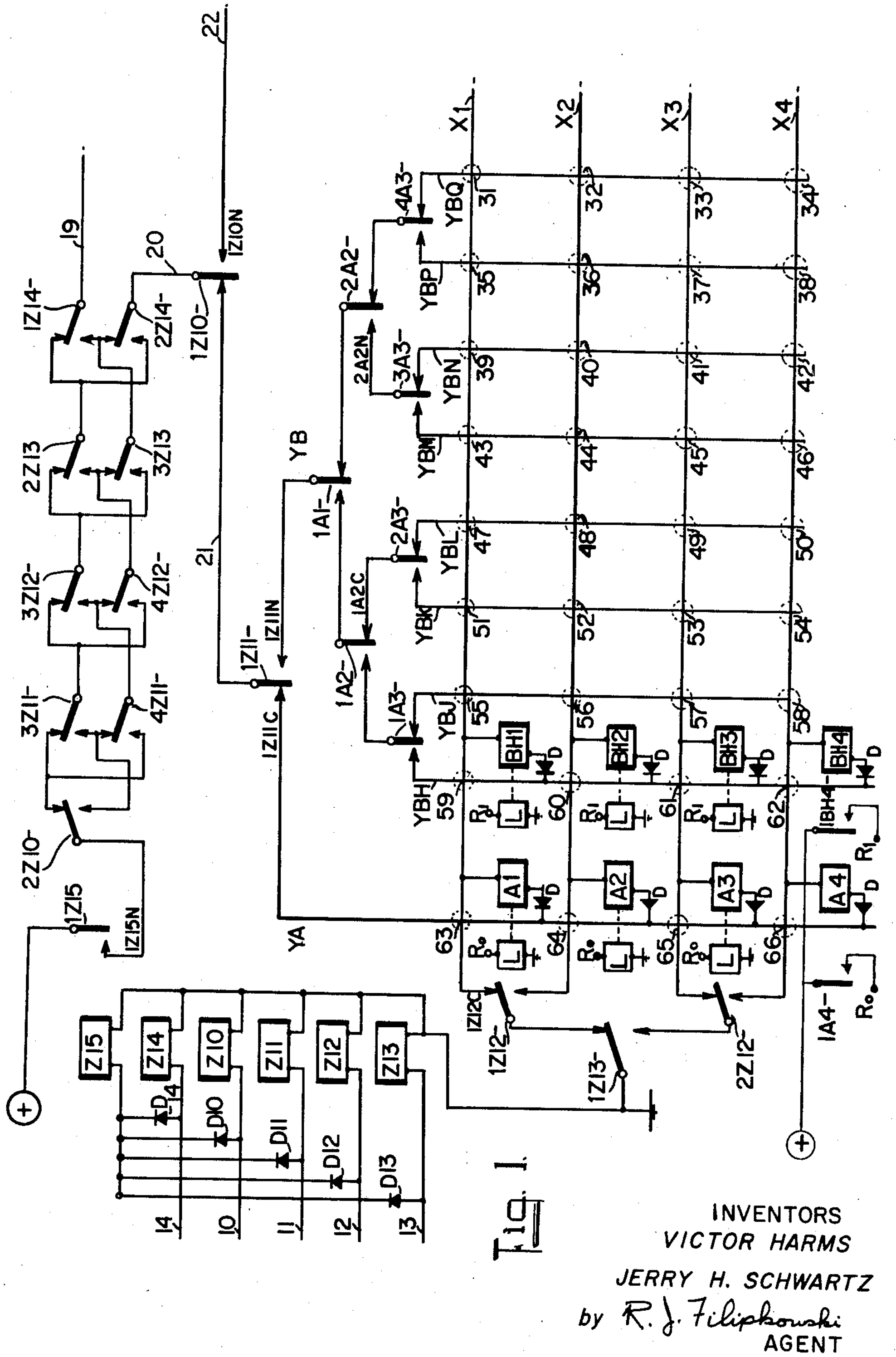

This invention relates to switching circuits, and more particularly concerns improved "tree" switching apparatus for multiplying the number of possible switching paths connectible with a supply to energize a load selected under control of a small number of control channels.

The development of "trees" of movable switch arms and their contacts provides apparatus for leading a connected path from an input conductor to a primary switch arm, thence through one contact of a pair of contacts associated with the arm, each contact in turn leading to further switch arms each being associated with a pair of further contacts, the number of arms in the respective ranks progressing according to the series:

$$1; 2; 4; \ldots 2^{(N-1)}$$

where N denotes the rank order of the arm. It is known to produce a selection by leading a first path over a first "tree" to one of a number X of a first group of buses, and leading a second path over a second "tree" to one of a number Y of a second group of buses, whereby to energize a selected load connected between the active X and Y buses.

Where the selection paths are controlled by selective energization of relays associated with each rank of switch arms in each tree, the number of ultimate load selections possible is $2^{2N}$, requiring the provision of communications links for each of 2N relays, where each tree has the same complement of elements. The difficulties of operating a selection system having a large number of remote communications links to serve such selection apparatus makes such system unsuitable where the number of available links or channels is limited and the maintenance of channels is costly.

The principal object of this invention is therefore to provide channel-controlled tree switching organizations and sub-trees controlled from circuits which are established in accordance with control of the primary trees, whereby to effect ultimately the selection of a load from a number of possible loads many times more numerous than may be served by use of known systems of equivalent apparatus.

According to the invention, apparatus is provided wherein a small number of links or channels serve as inputs to control two groups of selector relays each relay of which is controlled by an input, whereby to cause paths to be connected between sources of differing potential to select a further relay, for example one of the type which holds its contacts operated on momentary energization by current through the paths, thereby to connect a path in a sub-tree in one of the selector relay groups under control of the further relay or relays, whereby to evolve ramified and compounded selection paths in accordance with a sequence of input control signals.

Essentially the invention consists in an arrangement of switching elements, comprising a first group of selector relays, for example two, in tree circuit configuration, selectably energizable to apply a first electrical potential, for example ground reference potential, to one of four conductors or bars, while the second group of relays, for example two in number, serve to apply a different potential from a supply upon their selectable energization to a selected one of four further buses, one of which further buses serves loads connected across junctions made with the four bars, to operate latching relays connected therebetween; the respective latching relays being operable to actuate selector relays of different orders to set up sub-tree paths in the three other buses of the second group, there being also provided other latching relays progressively selectable in further sub-trees, and so forth.

Accordingly, a series of input signals for selective energization of predetermined relays of the two groups of primary selectors serves to progress selection paths through the several sub-trees of the system and to actuate a desired load in a matrix. For example, where there are three sub-trees branching from respective buses fed from the contacts of a pair of selector relay switch arms of the second group of primary selectors, and three latching relays are controlled in each sub-tree from the operation of the two groups of primary selectors, to operate corresponding ranks of secondary selector switch arms to extend paths leading from the buses, the number of possible ultimate matrix selections for the system is:

$$3[(8\times4)]-P$$

where P is the number of control positions at the intersections of the bars with the bus extensions reserved for selecting paths in a succeeding sub-tree matrix, including positions for clearing functions.

In carrying the invention into effect, the input signals to each relay of the four relays comprising the primary selectors may conveniently take the form of unidirectional voltage impulses and the selector relays are chosen to be of fast acting type and have two alternate arm positions, while each of the relays directing paths through the sub-trees is a mechanically self-latching electrically-releasable type holding its arms operated on momentary operation of the primary selectors. In a practical embodiment, the impulses are transmitted on separate channels to be received remotely and converted to voltage pulses effective to operate the primary selectors, those of the first group having their arms actuated to direct a path leading from a local source supplying a first electrical potential to a selected bar, thence through the winding of a latching relay at a junction made by the bar with a bus and therefore over primary selector switch arms of the second group to a reference potential source. A succession of not more than three sets of impulses delivered to the primary selectors suffices to reach any load served by the buses of the first sub-tree, including specific loads in the form of latching relays for conditioning a second sub-tree. Therefore a total of not more than six sets of impulses in sequence may effect selection of a load in a second sub-tree, and not more than nine sets may effect a selection of a position in the third sub-tree matrix.

The release of specific groups of latched relays to effect a clearing function is brought about by transmitting a sequence of sets of impulses in a similar manner to energize a pre-determined matrix junction having a relay winding connected across the junction.

In order that the invention may be more clearly understood and readily carried into effect preferred embodiments thereof will be more particularly described with reference to the accompanying drawing, in which, FIGURE 1 and FIGURE 2 respectively comprise left and right contiguous portions of a switching circuit diagram according to the invention, having two pairs of primary selector relays served by input channels; and, FIGURE 3 is a diagram illustrating a sequence of transmissions and the progress of selection of a device controlled from a junction in the third sub-tree matrix of FIGURE 2.

Throughout the following description the designations for components will consistently follow a scheme of nomenclature adopted to facilitate repeated reference to component elements without ambiguity. The designation of a relay actuated from a channel or signal link includes the prefix Z, followed by one or more ciphers, as, Z12; a switch arm or pole operated by the relay is designated by the suffix dash (–) and bears a numerical prefix, as 1, 2, 3, etc. according to the number and position of the pole in a stack; for example, 2Z12– indicates the second pole of Z12. The normally open contact associated with an arm or pole is designated by the prefix numeral of the pole and the suffix N, while the normally closed contact bears instead the suffix C. The suffix letter does not change with the operational state of the arm.

Where a latch element electrically releasable is associated for holding a switch arm operated after energization, the prefix L followed by a dot is placed ahead of the relay designation.

Where the relay winding is connected at a matrix position between lettered vertical or ordinate buses and numbered horizontal or abscissa bars, the prefix is not Z, but instead is made up of the combination of the bus letter and bar numeral. For example, a relay operated by current through its winding connected at the junction of bus $Y_A$ and bar $X_1$ is marked A1; similarly BJ4 would designate a relay operated by bus $Y_{BJ}$ in the first sub-tree and horizontal bar $X_4$.

Referring to the drawing, a selector system receives positive voltage impulses over leads 10, 11, 12, 13, in any combination of simultaneously energized or de-energized states, in accordance with information code transmitted from a sending point (not shown). Fast-acting selector relays Z10, . . . Z13 inclusive operate to throw associated poles according to the inputs signalled. Each incoming lead is connected by means of a respective diode device of the group D10, . . . D13 to a common terminal of a further relay Z15, so that if any one input lead is energized, Z15 must also operate, to close 1Z15– on 1Z15N, applying positive potential from local supply marked (+).

The illustrated circuit includes a further relay Z14 and its input control lead 14 and further includes a pair of ranks of switch arms operated by the several selectors, of which 1Z14– and 2Z14– are the terminal file members. The latter are respectively connected with leads 19, 20, for the purpose of verifying that an odd number of signal relays Z10, Z11, Z12, Z13, and Z14 have been energized, before positive potential is applied to conductor 20. For this function, a special code, as is described more particularly in applicants' copending application entitled "System For Reading Perforated Tape Record and Translator Apparatus Having Error Monitor Circuits," Serial No. 48,014, filed August 8, 1960, is employed. The verification function is carried out by the interconnected ranks of switch arms, of which the left-hand member 2Z10– is common, and respectively including, in the upper rank, arms 3Z11–, 3Z12–, 2Z13–, 1Z14–; and having in the lower rank, arms 4Z11–, 4Z12–, 3Z13–, and 2Z14–. The interconnection of the respective alternate contacts associated with each arm is so arranged that where as even number of relays of the group Z10, Z11, Z12, Z13 is energized, an impulse must also be transmitted on line 14. If an odd number of the relays in the group are actuated, no impulse is required to be sent on line 14. Hence, if line 14 is energized when either one or three of the group of relays Z10 . . . Z13 are actuated, or if line 14 fails to carry a transmitted impulse when two or four of the relays are actuated, supply potential does not appear on conductor 20, but appears instead on conductor 19 to give warning of error. Whenever an even number of input leads in the exemplary embodiment are simultaneously energized the positive potential is connected by a path commencing with 1Z15–, leading to 1Z14– and a device (not shown) for preventing further translation until attended to. When an odd number of leads 10, . . . 14 are simultaneously impulsed, the path from positive supply extends to arm 2Z14– and thence by way of conductor 20 to arm 1Z10–, and either of arms 1Z11– or 2Z11– branching therefrom.

If it now be assumed for purpose of illustrating system functions that an incoming set of impulses are carried on lines 12, 13, and 14 only, associated relays Z12, Z13 and Z14 will be energized and a path will be provided for current to ground by way of 1Z13– over 1Z13N, 2Z12– and 2Z12N to horizontal bar $X_4$, while the normally closed contacts 1Z10C and 1Z11C will provide a path including poles 1Z10– and 1Z11– between positively charged conductor 20 and vertical bus $Y_A$. The winding of relay A4 connected between $Y_A$ and $X_4$ will receive energizing current and arm 1A4– will move to apply positive potential to terminals $R_0$ and $R_1$, thereby releasing latch relays L.A1, L.A2, L.A3, L.BH1, L.BH2, and L.BH3; similarly, the latch release elements of further sub-tree secondary selectors such as L.CH1, L.CH2, and L.CH3 may be arranged to be released together with the foregoing by application of positive potential to terminals $R_2$. It is to be understood that the system may be cleared in varying degrees, and accordingly terminals $R_0$ and $R_1$ only may be energized together or $R_0$ exclusively may be energized by 1A4– as desired for specific applications.

In subsequent transmissions of impulses on leads 10 . . . 14, one or more of the secondary selectors A1, A2, and A3 may be operated, to actuate arms in respective ranks of the sub-tree branching from arm 1Z11–. In particular, positive potential may be extended over 1Z10– to conductor 21, then by way of 1Z11– and 1Z11N to $Y_B$, leading to 1A1– initially, and ultimately reaching one of the eight buses $Y_{BH}$, $Y_{BJ}$, . . . $Y_{BQ}$. For example, to reach specific positions of the matrix junctions numbered 31, 32, . . . 66 inclusive, an appropriate vertical bus and a horizontal bar are caused to be connected respectively with positive supply voltage, and ground potential. The selection of a load at matrix position 60, as the junction of bus $Y_{BH}$ with bar $X_2$ is designated, will now be traced through to show how the winding of secondary selector BH2 is energized.

Sets of impulses are fed to the input leads to actuate Z12 and Z13 in such manner as to successively energize bars $X_1$, $X_2$, and $X_3$ at ground potential, while Z10 and Z11 remain non-operated. Upon each transmission of impulses, 1Z15– moves to connect positive potential to bus $Y_A$, so that loads connected across the junctions 63, 64, and 65 will be momentarily actuated, and relays A1, A2 and A3 will accordingly operate and latch in operated state. As a result a circuit will be extended from $Y_B$ to bus $Y_{BH}$ over 1A1–, 1A2–, and 1A3–. A further set of impulses is next fed into the input leads to actuate Z11 and Z12, to ground $X_2$ and to lead current from positive supply to $Y_{BH}$ when 1Z11– connects with 1Z11N.

In a similar manner the other secondary selectors BH1 and/or BH3 are operable by respectively causing bars $X_1$ or $X_3$ to be grounded through appropriate inputs to Z12 and Z13. The three secondary selectors BH1, BH2 and BH3 are employed to control selection paths in the second sub-tree branching from $Y_C$. By selecting position 62 to energize BH4, a release of L.BH1, L.BH2 and L.BH3 is effected, upon connection of 1BH4– with terminals $R_1$ thereof.

The selection of a position in the matrix controlled by the third sub-tree, namely the switching circuit branching from $Y_D$, is performed by selectably energizing desired combinations of CH1, CH2, and CH3, controlled from the preceding sub-tree branching from $Y_C$. By energizing CH4, the terminals $R_2$ are connected with supply voltage to clear L.CH1, L.CH2, L.CH3.

Figure 2:
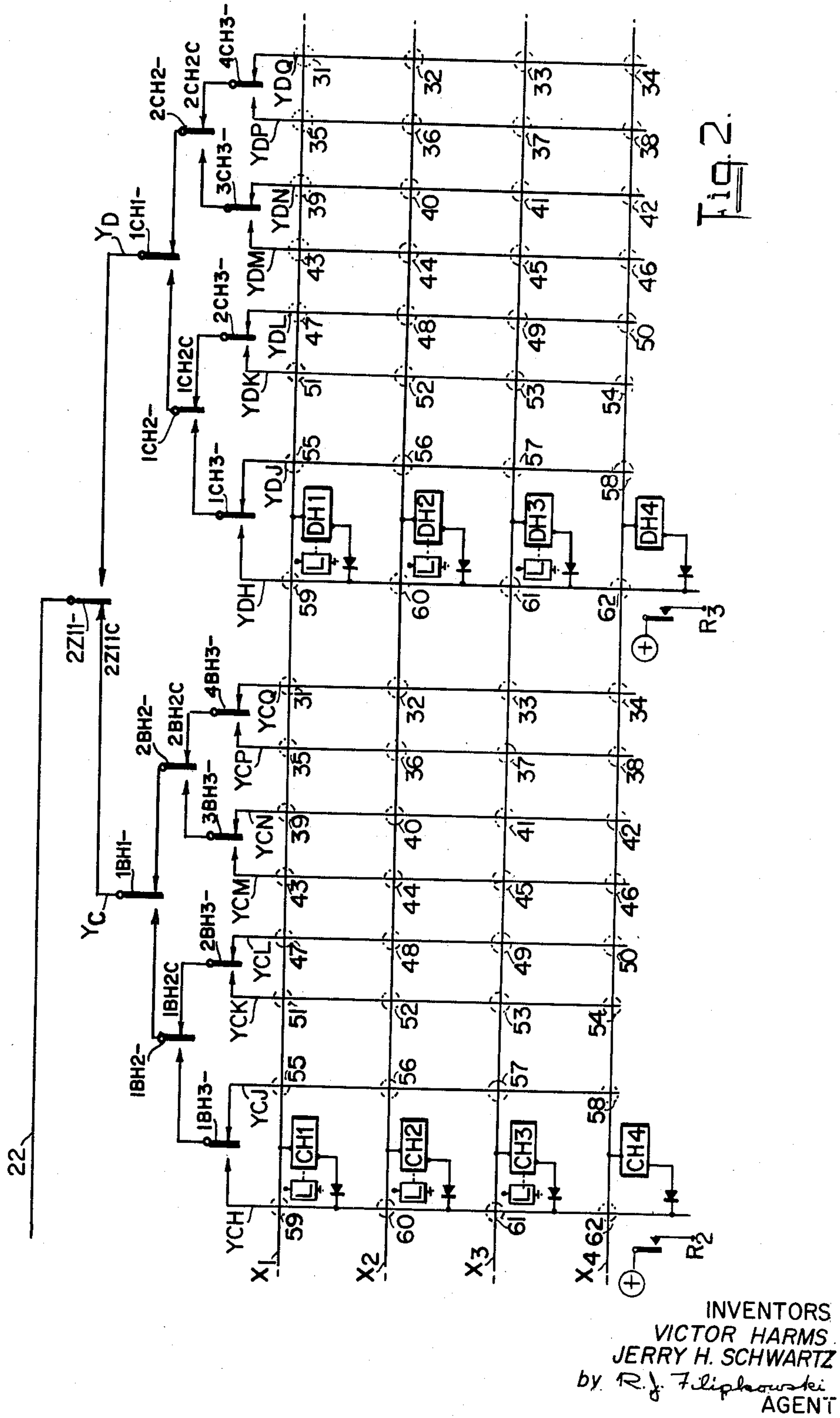

Since $Y_C$ and $Y_D$ respectively connected with 2Z11C and 2Z11N of a primary tree cannot be energized together, it will be apparent that a selection path in the second sub-tree does not affect a previously prepared path in the third sub-tree and vice versa; similarly it will be seen that by the operation of switch arms in the primary tree branching from 1Z10–, there can be only one vertical bus energized out of the total complement of twenty-five illustrated in FIGURES 1 and 2.

By reference to FIGURE 3, the composition or content of signal sets transmitted to the system for the purpose of actuating desired loads in each sub-tree matrix may be readily understood, and the clearing of stored data comprehended.

The character of the loads energizeable at any matrix position is not relevant, since such loads may take various forms; for purpose of illustration, a controlled element is operable by the application of differing potentials supplied thereto by the vertical bus and the horizontal bar connected with its terminals, and may comprise a relay winding, a lamp filament, a motor, or other energy transformation device.

In a practical system for remote control of an automated process, certain positions of a matrix may be allocated for operating a device to one state, e.g. "on," while another position or positions may be allocated for changing such state, e.g. to turn the device "off."

While in the foregoing the invention has been described with reference to primary trees having two ranks of primary selectors each, its useful applications extend to arrangements of higher complexity wherein either one or both of the primary trees, i.e. those branching respectively from 1Z13– and 1Z10–, has three or more ranks of primary selectors. For example, it will be readily appreciated that by enlarging the primary tree from 1Z13– to three ranks instead of two, there will be eight horizontal bars serving the matrices. Such an organization would afford the possibility of reducing the secondary selector ranks to two in each sub-tree without reducing the ultimate number of selectable matrix positions. The bus $Y_A$ would therefore serve eight control relays of the character of A1, A2, . . . etc., hence a total complement of six secondary selectors in the three sub-trees may be controlled from the primary bus $Y_A$, and two positions may be allocated for clearing functions.

As a further example, by the addition of a third rank of primary selectors in the primary tree branching from 1Z10– and retaining the four horizontal bars as illustrated, seven matrices of 8 x 4 junction configuration may be realized. It is believed that other combinations and arrangements for specific purposes in accordance with the principles set forth herein will readily occur to those versed in the switching art, and accordingly applicants intend that the exemplary embodiments described hereinbefore are not to be regarded as limiting the invention, whose scope is more properly set out by the acompanying claims.

We claim:

1. In a switching circuit for selection of a load, a matrix comprising a set of bars and a set of buses, a first and a second supply of differing reference potentials, means to connect a selected bar with said first supply including a first primary tree of selector arms, means to connect a selected bus with said second supply comprising a second primary tree of selector arms, path directing storage devices having a terminal connected with a selected bar and a terminal connected with a selected bus, further selector arms connected in sub-tree configuration branching from an arm of said second primary tree, said further arms being operable on energization of said storage devices from said sources, a group of said buses terminating said sub-tree, and unidirectional current load devices each having one terminal connected with a bus and another terminal connected with a bar.

2. A circuit as in claim 1 wherein said storage devices comprise latchable relays energizeable to hold said further selector arms operated.

3. A circuit as in claim 2 wherein one of said load devices comprises an electromagnetic switch operable to release said latchable relays.

4. A circuit as in claim 1 wherein different ones of said further selector arms are actuatable by operation of said primary tree selector arms in sequence whereby to extend a path from said second source through said second primary tree and said sub-tree to select a bus.

5. A circuit as in claim 1 wherein each selector arm is associated with a pair of contacts and wherein said buses and said bars branch from the terminal selector arm contacts of respective primary trees.

6. A circuit as in claim 5 wherein one contact of the terminal selector arms of said second primary tree is connected with a primary bus and each remaining contact is connected with the initial selector arm of a sub-tree of selector arms and wherein the contacts associated with the terminal selector arms of said sub-trees are connected with buses.

7. A circuit as in claim 5 wherein one bus of each group of buses branching from each sub-tree has like terminals of associated storage devices connected therewith and each bar has like other terminals of said associated devices connected therewith, and each storage device controls ranks of selector arms in a different sub-tree.

8. A switching circuit for supplying a selected one of a multiplicity of loads, comprising a primary matrix having a set of horizontal bars and a primary bus, an auxiliary matrix comprising a plurality of secondary buses and having said bars in common, first and second sources of reference potential, a set of input signal lines, first and second groups of primary selectors in tree configuration respectively branching from said first source to individual bars and branching from said second source to individual buses including said primary bus, said selectors being responsive to a first set of signals on said lines to select a bar and said primary bus, a first set of storage means each having one terminal connected with a bar and a terminal connected with said primary bus and being operable to select a secondary bus, said load means each having a terminal connected between a secondary bus and a bar for selectable actuation from said sources of potential.

9. A circuit as in claim 8 wherein said storage means comprise latchable electromagnetic relays for holding said selection of a secondary bus and wherein a load connected between a bar and said primary bus comprises a latch release relay.

10. A remote control switching circuit for supplying a selected one of a multiplicity of loads, comprising a primary matrix having a set of horizontal bars and a primary bus, a plurality of auxiliary matrices each comprising a plurality of secondary buses and each having said bars in common, first and second sources of differing reference potential, a set of input signal lines, a pair of primary selector switch groups having selector arms in binary progression and each being interconnected as first and second primary tree circuits respectively branching from said first and said second sources, the terminal contacts of said first primary tree being connected with said bars, one of the terminal contacts of said second primary tree being connected with a primary bus and each of the remaining terminal contacts of said second primary tree being connected with initial selector arms of corresponding sub-tree circuits, each of the sub-trees having its terminal contacts connected with a bus of respective bus groups of said matrices, said primary bus and one bus of each of said groups forming with said bars respective sets of selector control junctions, means responsive to signals fed on said lines to actuate the primary trees, releasable holding devices operated from said primary bus junctions for controlling ranks of selector arms of a first sub-tree, and further releasable holding devices operable from the junctions of each said one bus with said bars for controlling ranks of selector arms of another sub-tree.

11. A remote control switching circuit for controlling a selected one of a multiplicity of loads, comprising a primary matrix having a set of horizontal bars and a primary bus forming path control junctions with said bars, a plurality of auxiliary matrices each having said bars in common and separate pluralities of secondary buses forming with said bars load controlling junctions each having one of said loads connected between a bus and a bar, first and second sources of differing reference potentials, a set of input signal lines, first and second groups of primary selector switch arms having associated alternate contacts each group of said arms and contacts comprising a primary tree circuit branching from respective sources, means responsive to signals fed to said lines for connecting a bar and a primary bus with respective sources through said primary trees, storage means energizeable from respective path control junctions for actuating ranks of auxiliary selector switch arms, said ranks of auxiliary arms having associated alternate contacts interconnected in a first sub-tree circuit branching from a contact of a terminal arm of said second primary tree, a first group of secondary buses individually connected with terminal contacts of said first sub-tree, one bus of said first group forming auxiliary path control junctions with said bars, a second group of secondary buses, and auxiliary storage means operable in response to energizing of respective auxiliary path control junctions to control further ranks of auxiliary selector switch arms and associated contacts interconnected in a second sub-tree circuit, whereby to extend a path leading through said second sub-tree from a terminal contact of said second primary tree to select a bus from said second group of secondary buses connected with terminal contacts of said second sub-tree.

12. A switching circuit for energizing loads selectably in accordance with a series of signals applied to input signal lines, comprising a supply source having polarized terminals, a matrix comprising sets of conductors designated as bars and buses having said loads connected therebetween, a switching sub-tree and a pair of switching primary trees comprising selector switch arms and branch conductors for connecting a path from each terminal to a load, one primary tree having its terminal conductors connected to said bars and the other primary tree having one terminal conductor connected to one of said buses and another terminal conductor connected with said switching sub-tree, a terminal group of conductors in said sub-tree being connected with respective buses, and control relays responsive to said signals for operating said primary tree switch arms, certain ones of said loads connected between said one bus and said bars comprising latching relays arranged to control switch arms of said sub-tree.

13. A circuit as claimed in claim 12 wherein a load connected between said one bus and one of said bars is a non-latching relay arranged to release said latching relays upon energization from said terminals.

14. A circuit as claimed in claim 13 wherein said other primary tree has a plurality of terminal conductors connected with respective further switching sub-trees, said further sub-trees having terminal conductors connected to respective buses and each sub-tree has one of its terminal conductors connected with a respective bus for selective energization of further latching relays connected between said respective bus and said bars, each further latching relay controlling the selector switch arms of another sub-tree.

15. A circuit as claimed in claim 14 wherein a path from a supply terminal to said one terminal conductor of a sub-tree is connected only when all the latching relays controlling the selector arms of that sub-tree have been operated in response to a series of signals applied to said input lines.

16. A load selector circuit comprising the combination with a translator having input channels, a pair of supply terminals of differing electrical potential, a pair of primary switching trees comprising selector arms and associated branch conductors, and control devices operative in response to electrical pulse signals in said input channels to control selector arms, of a matrix comprising a set of bars and a set of buses, a bar terminating each branch conductor of one primary tree and one bus terminating one branch conductor of the other primary tree, load devices connected between said buses and said bars including latching relay load devices connected between said one bus and respective bars, and sub-trees comprising selector arms branching from other branch conductors of said other primary tree and having terminal branch conductors connected with remaining buses, said latching relay devices controlling paths in one of said sub-trees, and means responsive to energization of predetermined ones of said loads to release predetermined ones of said relay devices.

17. A load selector circuit as claimed in claim 16 wherein said one of said sub-trees has terminal branch conductors connected with a group of remaining buses of said set, one bus of said group having further latching relay devices connected respectively therewith and with said bars for controlling paths through another sub-tree.

18. In a load selection system comprising a set of signal lines, a matrix having a set of conductor bars and a set of conductor buses, a pair of supply terminals, a plurality of loads each connected between a bar and a bus, means for energizing a load selectably from said supply terminals comprising a pair of primary switching trees having terminal branch conductors respectively connected to said bars and to said buses and energizeable in accordance with signals on said lines, the improvement comprising means responsive to sequences of signals for progressing a load selection, wherein one of said primary trees has a terminal branch conductor connected with a bus, storage control elements connected between said bus and said bars, and has its other terminal branch conductors connected to respective sub-trees, said storage control elements controlling the operation of switches in said sub-trees, and means responsive to energization of predetermined loads for clearing said storage control elements.

References Cited in the file of this patent

UNITED STATES PATENTS 2,844,811 Burkhart ---------------- July 22, 1958